Sept. 21, 1954  G. S. ROTHMAN  2,689,948
LICENSE PLATE HOLDER
Filed Oct. 5, 1950  2 Sheets-Sheet 1
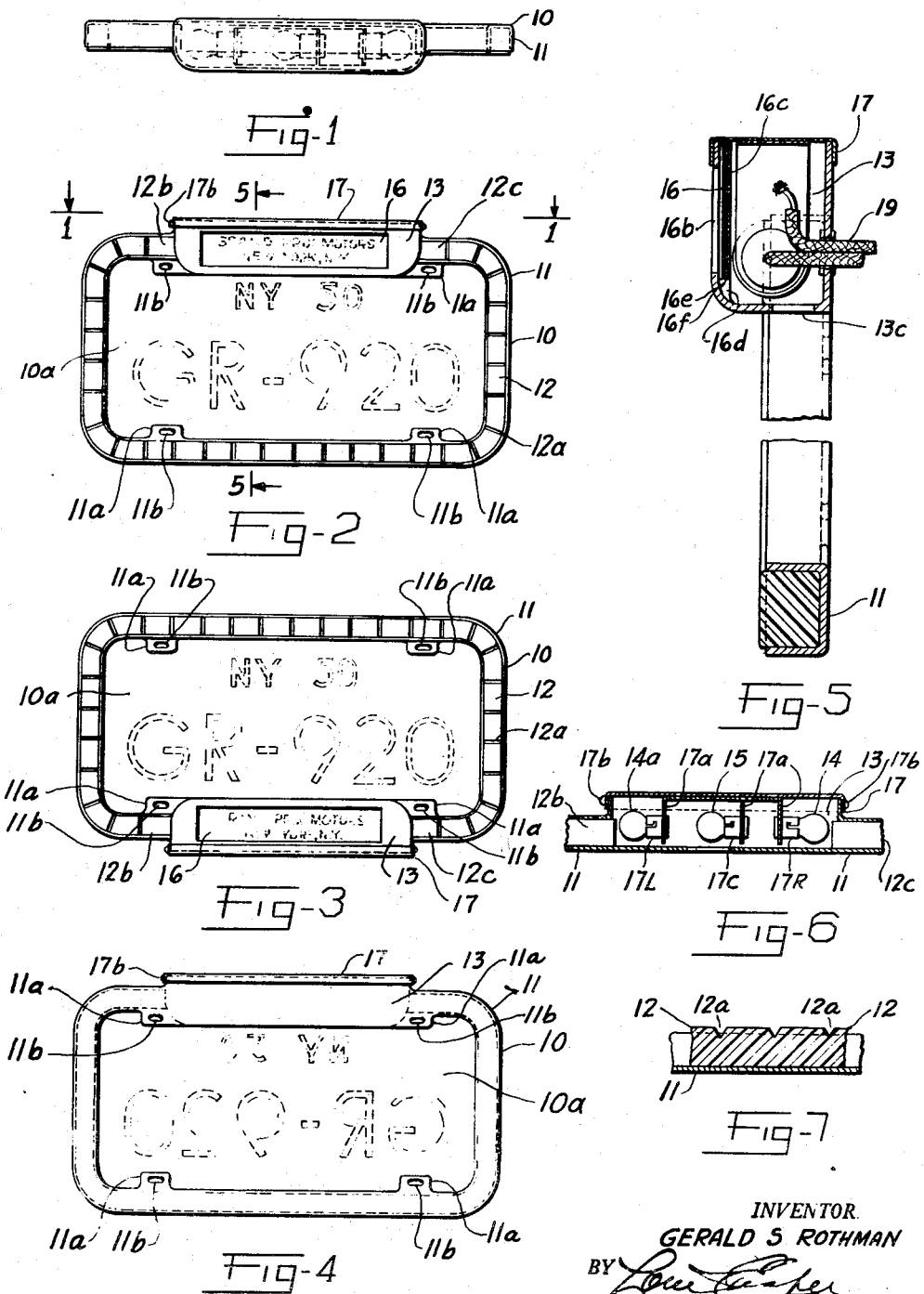
INVENTOR.
GERALD S ROTHMAN
BY
ATTORNEY Sept. 21, 1954  
G. S. ROTHMAN  
2,689,948  
LICENSE PLATE HOLDER
Filed Oct. 5, 1950
2 Sheets-Sheet 2
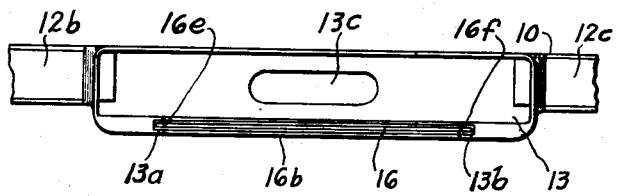
Fig-8
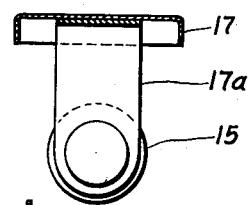
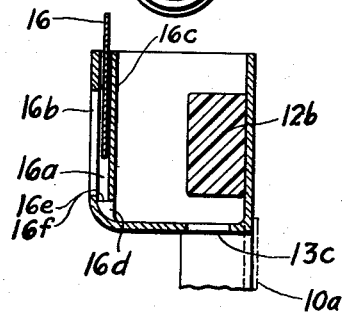
Fig-9
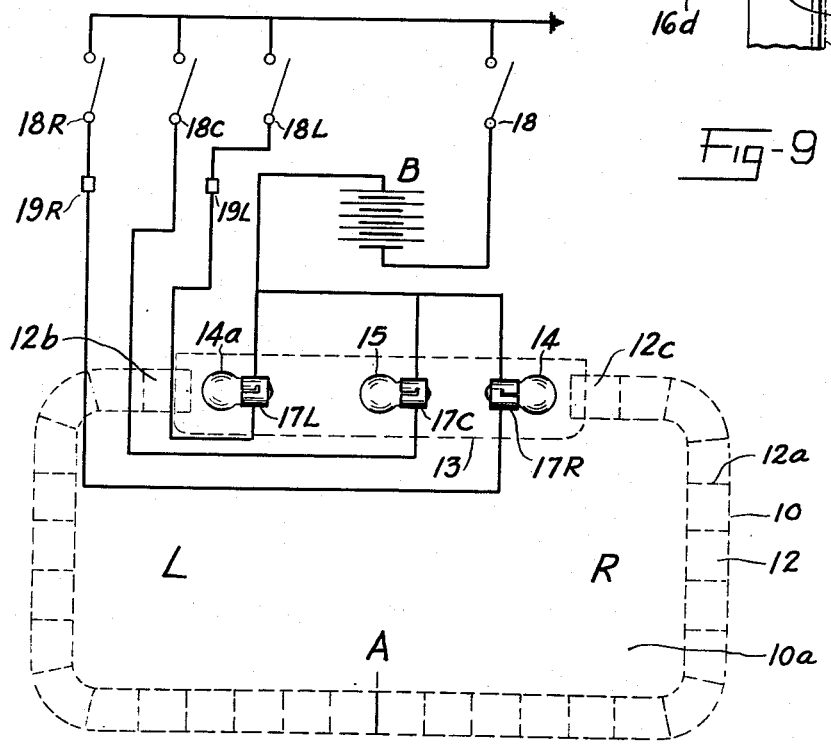
Fig-10
INVENTOR.
GERALD S. ROTHMAN
BY
ATTORNEY Patented Sept. 21, 1954

2,689,948

UNITED STATES PATENT OFFICE 2,689,948

LICENSE PLATE HOLDER

Gerald S. Rothman, Elmhurst, N. Y.

Application October 5, 1950, Serial No. 188,504

5 Claims. (Cl. 340—74)

My invention relates to a license plate holder for automobiles or the like and particularly of the illuminated type, said illumination being obtained by light reflective means surrounding the license plate holder and which is reflected from lighting means contained within said license plate holder.

The present invention is a continuation in part of my co-pending application Serial No. 157,474, filed April 22, 1950, now abandoned, which invention provides additional novel features not contained in said co-pending application.

An object of the invention is to provide improved reflective illumination of the border surrounding said license plate, said illumination having novel and attractive features.

A further object of the invention is to provide means for the control of the illumination of the border of said license plate holder, said control means being under the direction of the operator of the automobile upon which said plate holder is mounted.

A further object of the invention is the added illumination effect of the border surrounding said license plate of the added feature of linear facet gravings approximately equidistant apart on said border, the latter having distinctive light reflecting illuminating properties, said illuminating properties becoming evident in strong relief upon the illumination of said border.

Other objects and features of my invention will become apparent from the following description relating to the accompanying drawings showing the preferred form thereof.

In the drawings:

Fig. 1 is a top plan view of the license plate holder on the line 1—1 of Fig. 2;

Fig. 2 is a front elevation thereof;

Fig. 3 is a front elevational view showing a modification of that of Fig. 2 by the locating of the name plate block at the lower section of the license plate holder;

Fig. 4 is a rear view of the license plate holder as shown in Fig. 2;

Fig. 5 is a fragmentary sectional view of the license plate holder on the line 5—5 of Fig. 2;

Fig. 6 is a fragmentary sectional view of the name plate block showing the interior lighting means, and also showing the cover of said block;

Fig. 7 is a detail section showing the manner of formation of the linear facet gravings at the upper or face side of the border section of the license plate holder;

Fig. 8 is a plan view of the name plate block with the cover thereof removed;

Fig. 9 is a fragmentary sectional view of the name plate block with the cover thereof lifted and showing the manner of sliding the name plate into the slideaway channels for holding said name plate in position, and also showing the space section whereby light may be reflected at the bottom edges of said name plate; and Fig. 10 is a diagrammatical wiring plan of electric circuits included in the light switching and directional signaling arrangement.

Referring to the drawings, the designation 10 in general denotes the license plate holder, and 10a is the license plate proper which, as can be seen in the drawings, is in full view, and having a border consisting of Lucite, or like plastic light reflective material in rod or bar formation which is bent to conform to the contour of said license plate holder and is also secured in a channel in a manner similar to that shown in my co-pending application Serial No. 157,474, filed April 22, 1950, now abandoned.

A name plate block 13 is preferably mounted on the top portion of the plate holder as seen in Fig. 2. As an alternative, said name plate block 13 may be mounted at the bottom of said plate holder as shown in Fig. 3.

The Lucite or like border terminates at both sides of the name plate block 13. This can be more clearly seen in Fig. 6.

The name plate block 13 has contained within the chamber thereof three lamp sockets 17L, 17R and 17C, each having a lamp bulb 14, 14a and 15, respectively. The lamp sockets 17L and 17R are wired in a manner to be controlled through the medium of switches or contacting means by the driver of the vehicle upon which said license plate holder is mounted. The light bulb 15 remains constantly lighted while need prevails for the illumination of said plate holder. The purpose of the continuous lighting of the bulb 15 is for the illumination of the license plate 10a, and also for the illumination of the name plate 16, which is slid into slideaway grooves or channels 13a and 13b in the name plate block 13. The directional signaling operation of the Lucite border 11 and of the lamps 14, 14a and 15 will be fully described hereinafter.

The name plate block 13 is provided with a metallic cap or cover 17 as shown in Fig. 5. 11a are mounting lugs shown in Figs. 2 and 3. 11b are the slotted apertures for said mounting lugs.

The insulated wiring 19 is for the purpose of conducting current supply to the lamp sockets 17L, 17C and 17R, said current supply being contained within and a part of the lighting system incorporated in the vehicle and said wiring leads are an integral part of said wiring system of said vehicle.

At the front of the name plate block 13 is the phosphorescent Lucite or similar plastic name plate 16 which is slipped into the slideaway grooves 13a and 13b, and the latter plate can be readily removed for replacement by another name plate. In the space between the slideaway grooves 13a and 13b is a metal backing forming a wall 17a which is impenetrable to light so that the light required to illuminate the name plate shall come from one source, said source being reflected through the open space at the lower part 16d of the wall 17a, said wall having a seat 16e and 16f respectively at each side thereof and said open space being disposed between said seat portions. The light reflecting from the lamp 15 illuminates said open space and further reflects upon the lower edge portion of said name plate 16 with the consequent diffusion of the light upon the surface thereof. The name plate 16 may be pigmented with color, such as a red color, to heighten the artistic appearance of said illuminated name plate 16.

Referring to Figs. 2 and 3, illustrating the license plate holder 10, said holder having a channeled casing 11, said casing containing the border 12, said border made of the acrylic plastic groups, more especially of the type of plastics that possess crystal clarity and which have high light transmission and reflection characteristics, and also have a high degree of light diffusion, eliminating glare and spot brightness. The Lucite rod or bar 12 may be pigmented, such as a red color, to heighten effect and appearance.

The bar or rod 12 is made up of one integral piece of the plastic material and which has transversely disposed thereupon a series of linear triangular shaped grooves 12a. The manner of forming these transverse triangular linear shaped grooves is illustrated in Fig. 7, which shows a portion of the border 12. On said Lucite border 12 said inverted V-shaped or triangular cut formations 12a are made either by woodshapers or routing, or by molding said triangular grooves into the Lucite or similar material. The linear triangular shaped gravings 12a may also be made on the upper face side of the Lucite border 12.

The application of the linear triangular shaped gravings disposed transversely upon the border 12, as described, is to produce a novel illuminating effect, such effect being a concentration of light color at each of said linear triangular shaped gravings in sharply defined lines and in distinct contrast with the illuminated sections between said triangular gravings 12a disposed transversely on said border 12.

*Directional control illumination*

An important feature of my invention is in the directional signaling arrangement of the license plate holder, said arrangement being diagrammatically shown in Fig. 10, which figure consists essentially of a wiring diagram of the circuits included in the lighting system and also the selective manner of signaling through the medium of said lighting system.

There are four switches 13, 18L, 18R and 18C, said switches being mounted on the panel in front of the driver of the automobile in which said arrangement is installed.

The switch 18L when closed causes the lighting of the bulb 14a through its socket connections (17L), and the light from said lamp is reflected upon Lucite section 12b and thence approximately halfway around the section of the border designated as A.

The switch 18R when closed causes the lighting of the lamp bulb 14 and the light from said lamp is reflected upon the Lucite section 12c and thence halfway around to the point of the border designated as A.

The switch 18C controls the lighting of the lamp 15 through its socket 17C and the light therefrom is reflected to the name plate 16, and is also further reflected upon and illuminates the license plate 10a.

The switch 18 when turned to "on" position connects the battery B to ground, thereby closing the battery circuit for the three switches 18L, 18R, and 18C, and their respective connected associated lamps. When the switch 18 is "opened" the battery current feed for all said lamps are disconnected and when thus disconnected the lamps can no longer be lighted.

The driver of the car when about to drive to the left of the road will "open" the switch 18R, leaving the switch 18L "on" or connected. This action will darken the "R" area of the Lucite border 12.

Should the driver wish to indicate his intention to go to the right, then the driver will open the switch 18L which action will cause the area "L" of the Lucite border 12 to be darkened and the "B" side of said border shall have been illuminated.

The switching on of either of the switches 18R or 18L will also include either of the "flashers" 19R or 19L, said "flashers" being included in the switch circuits as shown in Fig. 10. The aforesaid "flashers" are well known in the art and allow the current to flow and to be disconnected intermittently; thus producing a flash lighting effect when either of the switches are turned on. Incorporated within the aforesaid flashers are switching means which are provided so that the flashing element therein may be cut off, or short-circuited, which would be the case when said driver of the car desired full and steady illumination of the license plate holder. The flashers when connected in the circuit as shown cause a flickering of the lighted border section selected, whether it be the right or left border section, and which serves as an added directive to call attention to the driver of the vehicle moving behind the vehicle upon which the license plate holder is mounted, of the intention of the driver thereof to make a turn to either the right or to the left.

As a modification of the location of the switches 18R and 18L as shown in Fig. 10, said switches may be located at the steering wheel of the car so that the turning of the wheel will automatically "close" one switch while "opening" the opposite side switch. For instance, a turn of the wheel to the left will close the switch 18L and open the switch 18R, while a turn of the wheel to the right will automatically close the switch 18R and open the switch 18L. Restoring the steering wheel to normal will close both switches 18L and 18R so that the border 12 shall be fully illuminated. The light 15 will remain constantly lighted unless the switch 18C is "opened," or the switch 18 is opened, in which latter case the lights 17L and 18L and 17C shall have been disconnected from the battery B and as a consequence all three lamps would no longer be lighted.

In the foregoing description of my invention I do not wish to confine myself to the shape or contour of the license plate holder, or to the border thereof, nor to the specific shaping or spacings of the linear facet gravings described and pointed out in the drawings. Said gravings may be of varied formations, for instance, a portion of said gravings may be formed into the shape of an arrow head at each side of the border of the license plate holder.

It is further obvious that further modifications are possible in my invention than that described in the specification without departing from the spirit thereof, and I therefore do not limit myself to the literal description herein made, being only limited by the scope of the appended claims.

What I claim is:

1. In a license plate holder for vehicles, a border surrounding said plate holder, said border comprising light reflective and transmission material, a pair of breaks in said border dividing the same into two separate light transmissive segments, separate lighting means in one of said breaks adjacent each of said segments whereby the segments of said border are selectively illuminated from reflective light from respective of said lighting means; switching means connected to said lighting means and controlled from said vehicle, said lighting means comprising a series of incandescent lamps whereby said border of reflective light material may be wholly or partially lighted through the medium of said switching means.

2. In a display device mountable upon a vehicle, said device having an arcuate border, said border including plastic material having light reflective and light transmission properties, a pair of breaks in said border dividing the same into two light transmissive segments, a name plate block adjacent to and interposed in one of the breaks of said border, slideaway channels mounted above and below the front portion of said block, a name plate slidably positioned between said slideaway channels, a series of incandescent lamps contained within an opening in said block, a wiring circuit included in said device and extending into said vehicle, said circuit including switching means and said incandescent lamps, said switching means controlled by the driver of said vehicle, said control of said driver effecting the switching of each individual incandescent lamp in said series of incandescent lamps, whereby said name plate may be lighted or extinguished, and also either segment of said border may be illuminated through the medium of said circuit, said incandescent lamps, and said switching means included therein the breaks separating the segments of said light reflective material and preventing the light from one illuminated segment from flowing into and illuminating an adjacent section whereby the illumination of an individual lamp illuminates only its respective segment of said border.

3. In a license plate holder for vehicles, a border surrounding said plate holder, said border comprising light reflective and transmission material, a pair of breaks in said border dividing the same into two separate light transmissive segments, a name plate holder and block adjacent and interposed in one of the breaks in said light reflective material; incandescent means within said name plate block, a name plate of light reflective and transmission material insertable in said name plate block, said incandescent lighting means causing reflective illumination of said border and said name plate, switching means electrically connected to said license plate holder, said switching means causing control of said incandescent lighting means whereby the light thereof may be controlled to reflectively illuminate or extinguish said illumination of said border segments and also to illuminate or extinguish said illumination of said name plate in said name plate block, the electrical circuits including said incandescent lighting means and said switching means causing through the medium of said switching means to selectively illuminate one segment of said border and the darkening of the opposite segment thereof, said selection of said border reflective illumination being under control of the driver of said vehicle, the other break in the continuity of the light transmitting ability of said border material permitting light from one incandescent lamp to illuminate only its respective segment of said border and preventing illumination of the other segment of said border associated with another incandescent lamp.

4. A display holder comprising an outwardly opening channel adapted to extend about the periphery of a vehicle license plate, a member fabricated of light reflective and transmissive material disposed within and extending along said channel, said member having a pair of breaks therein dividing the same into a pair of separate light transmissive segments with one pair of ends of said segments in facing spaced relation with respect to each other, a name plate holder overlying the space intermediate one pair of segment ends, lighting means in the space intermediate said segment ends for illuminating a plate disposed within said name plate holder and said segments, said lighting means selectively illuminable for selectively illuminating the segments of said member and the plate within said name plate holder, the other break in said member preventing the light from one illuminated portion when illuminated by its respective lighting means from illuminating another portion of said member.

5. A display holder comprising an outwardly opening channel adapted to extend about the periphery of a vehicle license plate, a member fabricated of light reflective and transmissive material disposed within and extending along said channel, said member having a pair of breaks therein dividing the same into a pair of separate light transmissive segments with one pair of ends of said segments in facing spaced relation with respect to each other, a name plate holder overlying the space intermediate one pair of segment ends, lighting means in the space intermediate said segment ends for illuminating a plate disposed within said name plate holder and said segments, said lighting means comprising a lamp adjacent an end of each segment, a lamp intermediate said first named lamps, a circuit connecting said lamps for selective actuation thereof, light barrier separating said lamps from each other and the break in the opposite ends of said segments preventing transmission of light from one segment to the other whereby the light from one lighting means illuminates only its respective segment of said member.

References Cited in the file of this patent

UNITED STATES PATENTS

| Number | Name | Date |
| --- | --- | --- |
| D. 163,328 | Rathman | May 15, 1951 |
| 1,135,144 | Stafford | Apr. 13, 1915 |
| 1,943,440 | Horni | Jan. 16, 1934 |
| 2,015,513 | Caiati | Sept. 24, 1935 |
| 2,156,806 | Ducey | May 2, 1939 |
| 2,171,713 | Roose | Sept. 5, 1939 |
| 2,207,117 | Collins | July 9, 1940 |
| 2,480,393 | Bossert | Aug. 30, 1949 |
| 2,551,622 | Mohr | May 8, 1951 |